United States Patent [19]

Miyazono et al.

[11] Patent Number: 5,455,998
[45] Date of Patent: Oct. 10, 1995

[54] METHOD FOR MANUFACTURING AN INK JET HEAD IN WHICH DROPLETS OF CONDUCTIVE INK ARE EXPELLED

[75] Inventors: Yutaka Miyazono, Kasuga; Mitsuhide Matsuda; Hideaki Horio, both of Fukuoka; Kazumi Ohtsubo, Kurume; Takumi Inoue, Fukuoka, all of Japan

[73] Assignee: Matsushita Electric Industrial Co., Ltd., Osaka, Japan

[21] Appl. No.: 981,735

[22] Filed: Nov. 25, 1992

[30] Foreign Application Priority Data

Dec. 2, 1991 [JP] Japan .................................. 3-317690

[51] Int. Cl.⁶ .............................. H05B 3/00; G01D 15/16
[52] U.S. Cl. ...................... 29/611; 29/890.1; 219/121.71; 347/47
[58] Field of Search ..................... 29/611, 890.1; 347/47, 54, 55; 219/127.7, 121.71

[56] References Cited

U.S. PATENT DOCUMENTS

| | | |
|---|---|---|
| 3,179,042 | 4/1965 | Naiman . |
| 4,595,938 | 1/1986 | Conta et al. . |
| 4,679,059 | 7/1987 | Dagna ........................ 347/54 |
| 4,922,265 | 5/1990 | Pan ........................... 29/890.1 |

FOREIGN PATENT DOCUMENTS

| | | |
|---|---|---|
| 58-38110 | 8/1983 | Japan . |
| 59-2619 | 1/1984 | Japan . |
| 61-59911 | 12/1986 | Japan . |
| 63-54547 | 10/1988 | Japan . |

Primary Examiner—P. W. Echols
Attorney, Agent, or Firm—Lowe, Price, LeBlanc & Becker

[57] ABSTRACT

A method for manufacturing an ink jet head which involves the steps of casting a first synthetic film on a metal film, etching the conductive metal to produce a pair of etched electrodes facing each other across an opening according to lithography and etching techniques, casting a second synthetic resin film being transparent on the etched electrodes and the first synthetic resin film, ablating both the first and second synthetic resin films with an excimer laser without damaging the electrodes to form both an expelling nozzle which penetrates the second synthetic resin film and an ink passageway which penetrates the first synthetic resin film through the opening, attaching an ink holding cap to the first synthetic resin film to hold conductive ink in a hollow portion thereof, and electrically connecting the etched electrodes with a voltage generator through electrical leads for applying a voltage generated in the voltage generator to the etched electrodes, wherein the etched electrodes project into the expelling nozzle. The conductive ink held in the ink holding cap is expelled from the nozzle through the ink passageway upon vaporization.

18 Claims, 9 Drawing Sheets

IRRADIATION OF EXCIMER LASER

IRRADIATION OF EXCIMER LASER

IRRADIATION OF EXCIMER LASER

METHOD FOR MANUFACTURING AN INK JET HEAD IN WHICH DROPLETS OF CONDUCTIVE INK ARE EXPELLED

BACKGROUND OF THE INVENTION

1. Field of the Invention

The present invention relates to a method for manufacturing an ink jet head in which droplets of conductive ink are expelled on a sheet of paper by causing vaporization of a portion of conductive ink due to an electric current flowing through the conductive ink.

2. Description of the Related Art

A printer utilized with a personal computer or a facsimile system has recently become popular for personal use while a large number of electronic devices have been utilized in an office. In this case, an ink jet printer has attracted a great deal of attention because the ink jet printer operates at a low noise level and high speed compared to impact printers. Especially, an on-demand type of ink jet printer is often utilized because the on-demand type of ink jet printer has a simple mechanism and is manufactured at a moderate price. In addition, droplets of ink are expelled on a sheet of paper on demanding in the on-demand type of ink jet printer so that the printer operates economically.

To expel the droplets of ink in the on-demand type of ink jet printer, many types of expelling methods have been proposed to date. For example, a portion of ink is mechanically pressurized and expelled by the action of a piezo-electric device in the ink jet printers disclosed in Japanese Patent Application Publication No. 2619/84 (S59-2619) and Japanese Patent Publication No. 38110/83 (S58-38110). Also, a portion of ink is pressurized by vaporizing the ink with an electrical resistive heater element in the ink jet printers disclosed in Japanese Patent Application Publication No. 59911/86 (S61-5991) and Japanese Patent Application Publication No. 54547/88 (S63-54547). In addition, a portion of conductive ink is vaporized by directly heating the conductive ink while passing an electric current through the conductive ink in the ink jet printer disclosed in U.S. Pat. No. 3,179,042. Furthermore, a portion of conductive ink is pressurized by vaporizing the conductive ink with an electric current in the ink jet printer disclosed in U.S. Pat. No. 4,595,938.

The ink jet printers of Japanese Patent Application Publication Nos. 2619/84 and 38110/83 are respectively provided with a piezo-electric device. Therefore, these ink jet printers respectively have a complicated mechanism and are expensive. In the same manner, because the ink jet printers of Japanese Patent Application Publication Nos. 59911/86 and 54547/88 are respectively provided with a heater element, the ink jet printers are inappropriate for commercial use.

On the other hand, the ink jet printers operated according to a direct electric heating method such as disclosed in U.S. Pat. Nos. 3,179,042 and 4,595,938 are appropriate for commercial use because only a pair of electrodes facing each other across a nozzle is required to vaporize the conductive ink. Accordingly, these ink jet printers can be manufactured with a simple structure even though they require a container for the conductive ink, a passageway for transmitting the conductive ink, a vaporizing system for vaporizing the conductive ink transmitted through the passageway, and an expelling system for expelling droplets of conductive ink.

2-1 Previously Proposed Art

The ink jet printers operated according to the direct electric heating method are described in FIGS. 1 and 2.

FIG. 1 illustrates a conventional ink jet head constructed in accordance with the basic concept of the invention disclosed in U.S. Pat. No. 3,179,042.

As shown in FIG. 1, the ink jet head is provided with an ink supply 11 for storing conductive ink, a ink heater 12 submerged in the ink supply 11 for keeping the conductive ink at a temperature near its boiling point in the ink supply 11, an ink tube 13 closed at its lower end of holding the conductive ink, an ink duct 14 for transferring the conductive ink from the ink supply 11 to the ink tube 13, a pair of electrodes 15, 16 facing each other across the surface of the conductive ink held in the ink tube 13, and a voltage source 17 for applying a voltage to the electrodes 15, 16.

In operation, the conductive ink heated in the ink supply 11 is supplied into the ink tube 13. Thereafter, the conductive ink held between the electrodes 15, 16 is vaporized and expanded at the upper portion of the ink tube 13 by passing an electric current from the electrodes 15, 16 through the conductive ink. As a result, a great deal of force is exerted upon the conductive ink directly so that the vaporized ink is expelled on a sheet of paper 18.

Accordingly, characters are printed on the sheet of paper 18 by the vaporized ink.

However, no manufacturing method for manufacturing the conventional ink jet head is described.

Also, because the vaporized ink is expelled from the top end of the ink tube 13, the top cross section of the ink tube 13 is large to expel the vaporized ink. Therefore, the size of the characters printed on the sheet of paper 18 is relatively large so that a large number of characters cannot be compactly printed on the sheet of paper 18.

In addition, the arrangement of the sheet of paper 18 is limited to be above the top end of the ink tube 13.

Accordingly, the conventional ink jet head shown in FIG. 1 is inappropriate for practical law.

FIG. 2 is a sectional view of a portion of another conventional ink jet head in accordance with the basic concept of the invention disclosed in U.S. Pat. No. 4,595,938.

As shown in FIG. 2, the ink jet head is provided with a container 21 formed of an insulating material for holding conductive ink in a passageway 22, a nozzle 23 is arranged at one end of the passageway 22 for expelling droplets of conductive ink, a ceramic base 24 covers one end of the passageway 22 to transmit the conductive ink through the nozzle 23, a pair of electrodes 25, 26 facing each other across the nozzle 23 passes an electric current through the conductive ink in the nozzle 23, a dielectric layer 27 covers the electrodes 25, 26 for submerging the electrodes 25, 26 in the conductive ink and for insulating the electrodes 25, 26 from a sheet of paper 28 or a user, and a anti-adhesion layer 29 covers the dielectric layer 27 for preventing particles of conductive ink from adhering to the outside surface of the conventional ink jet head.

In operation, when a voltage is applied to the electrodes 25, 26, an electric current passes through the conductive ink held between the electrodes 25, 26 so that the conductive ink is vaporized and expanded. As a result of the expansion of the vaporized ink, an expansion force is exerted upon the conductive ink held in the nozzle 23 surrounded by the dielectric layer 27. Therefore, a droplet of conductive ink is expelled from the nozzle 23 onto the sheet of paper 28.

Next, a manufacturing method of the conventional ink jet head shown in FIG. 2 is described.

A layer of ceramic base 24, a strip of conductive metal film, the dielectric layer 27, and the anti-adhesion layer 29 are laid on the container 21 in that order. Thereafter, the nozzle 23 is produced by drilling the layers and the strip of conductive metal film in a single operation, by means of a laser beam. Therefore, the strip of conductive material is divided into two to produce the electrodes 25, 26.

Accordingly, the conventional ink jet head shown in FIG. 2 can be easily manufactured.

In addition, because the droplet of conductive ink is expelled from the nozzle 23, a diameter of the nozzle 23 can be smaller than that of the ink tube 13 in the ink jet head shown in FIG. 1. Therefore, small size characters can be printed on the sheet of paper 28 during a printing operation in cases where droplets of conductive ink are simultaneously expelled from a plurality of nozzles 23 which are closely arranged in a matrix.

2-2 Problems to be Solved by the Invention

In the case where the layers and the strip of conductive metal film are drilled with a laser beam, the nozzle 23 must be produced right in the middle of the strip of conductive metal film, as shown in FIG. 3(A). In cases where the nozzle 23 is produced exactly in the middle of the strip of conductive metal film, the droplet of conductive ink is stably expelled because the electrodes 25, 26 face each other symmetrically.

In practice, it is difficult to produce the electrodes 25, 26 symmetrically without any special process. Therefore, as shown in FIG. 3(B), the nozzle 23 is often produced at a position deviated from the middle of the strip of conductive metal film. In this case, the distance between the electrodes 25, 26 shown in FIG. 3(B) is shifted by $2*L_1$ at one side and $2*L_2$ at another side as compared with that shown in FIG. 3(A).

The values of $L_1$ and $L_2$ depend on the deviation of the center of the nozzle 33 from the middle of the strip of conductive metal film. Therefore, when a large number of nozzles 23 are produced to print a letter on a sheet of paper 28, the distance between the electrodes 25, 26 of one nozzle 23 differs from those of the other nozzles 23.

As a result, the intensity of electric current flowing between the electrodes 25, 26 is varied, dependent on the distance between the electrodes 25, 26. Therefore, heating conditions for the conductive ink held in the nozzles 23 fluctuate. Accordingly, the amount of conductive ink expelled from each of the nozzles 23 cannot be controlled so that droplets of conductive ink cannot be stably expelled. In other words, characters cannot be clearly printed on the sheet of paper 28.

SUMMARY OF THE INVENTION

A first object of the present invention is to provide, with due consideration to the drawbacks of such conventional printers, a method for manufacturing an ink jet head in which droplets of conductive ink are stably expelled to clearly print characters on a sheet of paper. In addition, the first object of the present invention is also involves providing a method for reliably manufacturing a large number of ink jet heads.

A second object of the present invention is to provide an ink jet head manufactured by implementing the above method.

The first object of the present invention is achieved by providing a method for manufacturing an ink jet head in which droplets of conductive ink are expelled, which method comprises the steps of:

attaching a conductive metal film on a first insulating film;

etching the conductive metal to produce a pair of etched electrodes using lithography and etching techniques, with an opening being provided between the etched electrodes;

attaching a second transparent insulating film on the etched electrodes and the first insulating film, the etched electrodes being positioned between the first insulating film and the second transparent insulating film, and the opening being occupied with the second transparent insulating film;

excavating both the first insulating film and the second transparent insulating film with a beam of light to form both an expelling nozzle penetrating the second transparent insulating film through the opening and an ink passageway penetrating the first insulating film, the etched electrodes projecting into the expelling nozzle and the ink passageway communicating with the expelling nozzle;

attaching an ink holding cap to the first insulating film to hold conductive ink in a hollow portion thereof, the conductive ink being provided into the expelling nozzle through the ink passageway to expel the conductive ink from the expelling nozzle; and electrically connecting the etched electrodes with a voltage generator through electrical leads to apply a voltage generated in the voltage generator to the etched electrodes.

In the above method for manufacturing the ink jet head according to the present invention, the etched electrodes are produced from the conductive metal film by applying lithography and etching techniques. Therefore, the etched electrodes can be accurately produced with a regular shape. Also, the opening between the etched electrodes can be accurately formed in a regular shape. Accordingly, the intensity of an electric current flowing between the etched electrodes can be accurately adjusted to a regular value.

Also, the light with which both the first insulating film and the second transparent insulating film are formed is positioned on the basis of the etched electrodes by viewing the etched electrodes through the second transparent insulating film. Therefore, the central axis of the expelling nozzle can be precisely aligned with the central axis of the opening. In addition, the regular shape of the etched electrodes is not deformed by the light even though the etched electrodes are irradiated with the light.

Accordingly, the intensity of the electric current flowing between the etched electrodes can be maintained at a regular value.

In addition, the etched electrodes are projected into the expelling nozzles, and the surface area of the etched electrodes submerged into the conductive ink in the expelling nozzle is increased. Therefore, even though the cross-sectional size of the expelling nozzle is small, the Joule heat generated by an electrical current flowing into the conductive ink is enough to generate bubbles in the conductive ink. Accordingly, a droplet of conductive ink can be reliably expelled.

Also, even though a large number of expelling nozzles are formed in the ink jet head, the conductive ink held in one of the expelling nozzles is heated and expelled in the same manner as that held in the other expelling nozzles. Therefore, droplets of conductive ink can be stably expelled at a time to clearly print characters on a sheet of paper. Moreover, because strips of conductive metal films arranged at regular intervals are not required to produce a large number of pairs of etched electrodes, the ink jet head can be easily manufactured.

In addition, even though a large number of ink jet heads are manufactured, the etched electrodes and the expelling nozzles of the ink jet heads can be uniformly produced so that the ink jet heads can be reliably manufactured.

Furthermore, the ink holding cap is attached to the first insulating film after the expelling nozzle is formed by irradiating with the light. Therefore, the ink holding cap is not opened by the light.

It is preferred that the beam of light be a light beam from an excimer laser and both the first insulating film and the second transparent insulating film be respectively formed of a synthetic resin which has a molecular binding energy that is smaller than the metallic bond energy of the conductive metal.

In this case, both the first insulating film and the second transparent insulating film irradiated with the beam of excimer laser are respectively instantaneously ablated after the molecular binding of the synthetic resin is destroyed. Because the ablation of the synthetic resin is instantaneously generated, energy of the excimer laser is not transferred to peripheries of the films irradiated with the excimer laser.

Accordingly, the films not irradiated with the excimer laser are not damaged or deformed.

In addition, it is preferred that the step of forming both the first insulating film and the second transparent insulating film include:

adjusting energy intensity of the light beam of the excimer laser to excavate the films and not to damage the etched electrodes;

adjusting the cross-sectional size of the light beam of excimer laser to form the expelling nozzle in which the etched electrodes project;

irradiating the second transparent insulating film with the light beam of the excimer laser from over the second transparent insulating film; and irradiating the first insulating film with the light beam of the excimer laser from over the second transparent insulating film through the expelling nozzle to form the ink passageway having a cross-sectional size which corresponds to that of the opening.

In the above steps, because the energy intensity of the excimer laser can be easily adjusted, as is known, the films can be opened without damaging the etched electrodes.

Also, as is well known, because the beam size of the excimer laser can be easily adjusted, the cross-sectional size of the expelling nozzle can be suitably adjusted.

Accordingly, a large number of expelling nozzles can be compactly arranged on the ink jet head.

It is preferred that the method further includes the step of plating the etched electrodes projecting into the expelling nozzle to form metal-plated etched electrodes having high corrosion resistance after the step of excavating both the first insulating film and the second transparent insulating film.

In this case, because the metal-plated etched electrodes such as nickel-plated etched electrodes or platinum-plated etched electrodes are formed, the durability and the anticorrosion property of the etched electrodes are considerably improved.

It is preferred that the step of forming both the first insulating film and the second transparent insulating film include:

exposing a resist film applied on the second transparent insulating film with ultraviolet light through an exposure mask to print a prescribed pattern on the resist film;

etching the second transparent insulating film with an ion beam according to the prescribed pattern printed on the resist film to form the expelling nozzle;

etching the first insulating film with the ion beam according to the prescribed pattern printed on the resist film to form the ink passageway; and taking off the resist film.

In the above steps, because the expelling nozzle and the ink passageways are formed by applying lithography and etching techniques, the expelling nozzle and the ink passageway can be accurately positioned. Also, a large number of expelling nozzles can be easily and rapidly formed.

The first object of the invention is also achieved by providing a method for manufacturing an ink jet head in which droplets of conductive ink are expelled, comprising the steps of:

attaching a mask on a portion of a first insulating film;

adding a pair of electrodes facing each other through an opening on the remaining portion of the first insulating film by an electro-plating process before removing the mask;

attaching a second transparent insulating film on the electrodes and the first insulating film, the electrodes being located between the first insulating film and the second transparent insulating film, and the opening being occupied with the second transparent insulating film;

excavating both the first insulating film and the second transparent insulating film with a beam of light radiated from over the second transparent insulating film to form an expelling nozzle which penetrates both the first insulating film and the second transparent insulating film, the opening occupied with the second transparent insulating film being excavated to project the electrodes into the expelling nozzle;

attaching an ink holding cap to the first insulating film to hold conductive ink in a hollow portion thereof and to the expelling nozzle; and connecting electrical leads with the electrodes for applying a voltage generated in a voltage generator to the electrodes.

In the above steps, because the electrodes are produced by applying an additive process, the electrodes can be easily produced.

The second object of the invention is achieved by providing an ink jet head in which droplets of conductive ink are expelled, which comprises:

a pair of etched electrodes produced by etching a conductive metal film using lithography and etching techniques, conductive ink held in an opening between the etched electrodes which ink is vaporized by applying a voltage to the etched electrodes;

an insulating cover member arranged on the etched electrodes;

an expelling nozzle formed just above the opening by irradiating the insulating cover member with a beam of light to project the etched electrodes, the expelling nozzle holding the conductive ink expelled by the vaporization of the conductive ink held in the opening;

an insulating base for mounting the etched electrodes, the etched electrodes being positioned between the insulating cover member and the insulating base;

an ink passageway formed just under the opening by irradiating the insulating base with the beam of light, the ink passageway transmitting the conductive ink to both the opening and the expelling nozzle;

an ink holding cap attached to the insulating base for holding the conductive ink in a hollow portion thereof, the conductive ink being supplied into the ink passageway; and a voltage generator for generating voltage applied to the etched electrodes through electrical leads.

In the above configuration, when a voltage is applied to the etched electrodes from the voltage generator through the electrical leads, the conductive ink held in the opening between the etched electrodes is heated and vaporized due to the Joule heat generated by an electric current flowing through the conductive ink. Thereafter, the ink held in the expelling nozzle is expelled on a sheet of paper by an expansion force of the vaporized conductive ink.

In this case, since the etched electrodes are produced by using lithography and etching techniques, the distance between the etched electrodes can be adjusted at a regular value. Therefore, a droplet of conductive ink can be reliably expelled.

Also, because the expelling nozzle is positioned just above the opening, the droplet of conductive ink can be smoothly expelled from the expelling nozzle.

In addition, because the etched electrodes project into the expelling nozzle, the conductive ink held in the opening is efficiently heated and vaporized.

Furthermore, even though a large number of expelling nozzles are formed in the ink jet head, characters can be clearly printed on a sheet of paper because each of expelling nozzles is accurately positioned by irradiating the insulating cover member with the beam of light.

BRIEF DESCRIPTION OF THE DRAWINGS

The objects, features and advantages of the present invention will be apparent from the following description taken in conjunction with the accompanying drawings, in which.

DETAILED DESCRIPTION OF THE PREFERRED EMBODIMENTS

Preferred embodiments of a method for manufacturing an ink jet head in which droplets of conductive ink are expelled are described with reference to drawings. Also, an ink jet head manufactured by the method is described.

Figure 4:
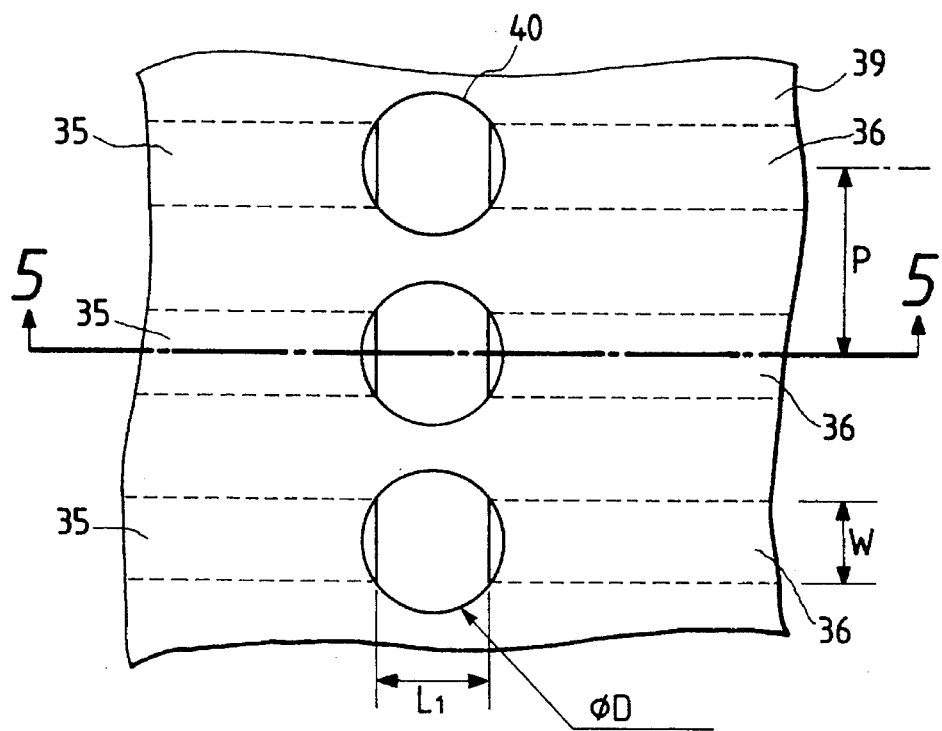
FIG. 4 is a plan view of a portion of ink jet head manufactured according to a first embodiment of the present invention.
Figure 5:
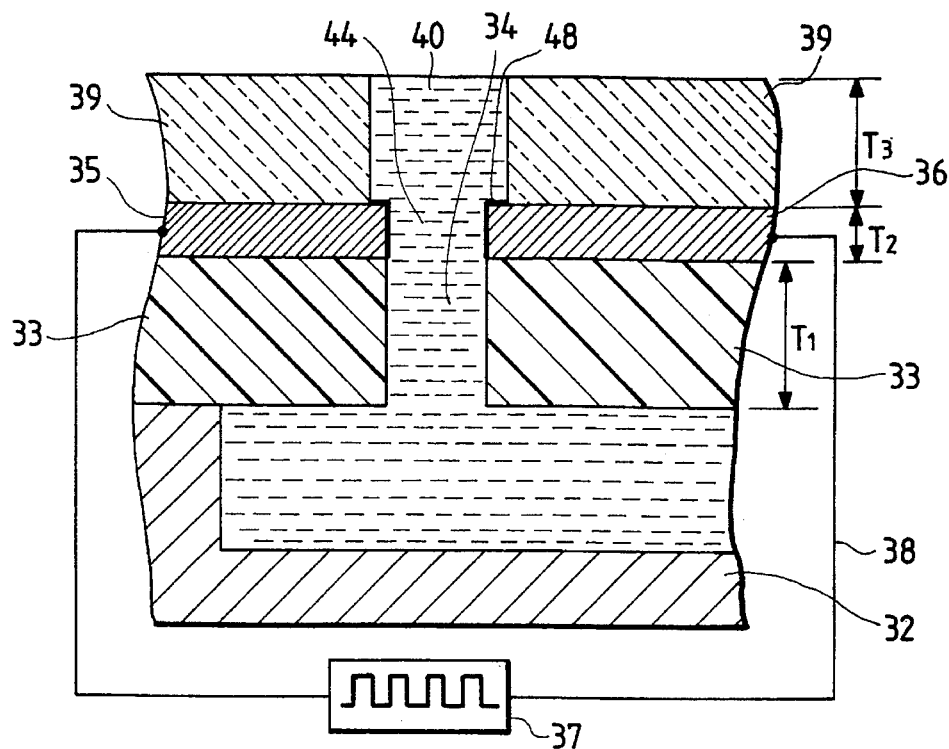
FIG. 5 is a sectional view of a portion of ink jet head taken generally along the lines 5—5 of FIG. 4.

FIG. 4 is a plan view of a portion of ink jet head manufactured according to a first embodiment of the present invention, and FIG. 5 is a sectional view of a portion of ink jet head taken generally along the lines 5—5 of FIG. 4.

As shown in FIGS. 4 and 5, an ink jet head 31 manufactured according to a first embodiment comprises an ink holding cap 32 for holding conductive ink in a hollow portion thereof, and an insulating base 33 for sealing the conductive ink held in the ink holding cap 32. A plurality of ink passageways 34 are opened through the insulating base 33 in a matrix to pass the conductive ink held in the ink holding cap 32. The insulating base 33 is formed of synthetic resin or the like, and the thickness $T_1$ of the insulating base 33 is 100 μm. Also, the specific resistance ρ of the conductive ink is 20 Ω*cm.

The ink jet head 31 further comprises a series of pairs of etched electrodes 35, 36 disposed on the insulating base 33, and a driving circuit 37 for applying a voltage E to the etched electrodes 35, 36 through electrical leads 38. Each of the etched electrodes 35, 36 face each other across an opening formed on the ink passageway 34. The etched electrodes 35, 36 are formed of a conductive metal. The thickness $T_2$ of the etched electrodes 35, 36 is 30 μm, and the width W of the etched electrodes 35, 36 is 40 μm. Also, the pitch P between the pairs of etched electrodes 35, 36 is 70 μm. In addition, the distance $L_1$ between the etched electrodes 35, 36 is 35 μm.

The ink jet head 31 further comprises an insulating cover member 39 arranged on the etched electrodes 35, 36 and the insulating base 33. The insulating cover member 39 is formed of transparent synthetic resin or the like, and the thickness $T_3$ thereof is 80 μm. In addition, a plurality of expelling nozzles 40 are opened through the insulating cover member 39 to expel the conductive ink passing through the ink passageway 34. The diameter D of the expelling nozzles 40 is 60 μm. Because the value D is higher than the values W, $L_1$, the etched electrodes 35, 36 project into the expelling nozzles 40.

Next, a method for manufacturing the ink jet head 31 shown in FIGS. 4 and 5 is described according to the first embodiment with reference to FIGS. 6 to 9.

Figure 6:
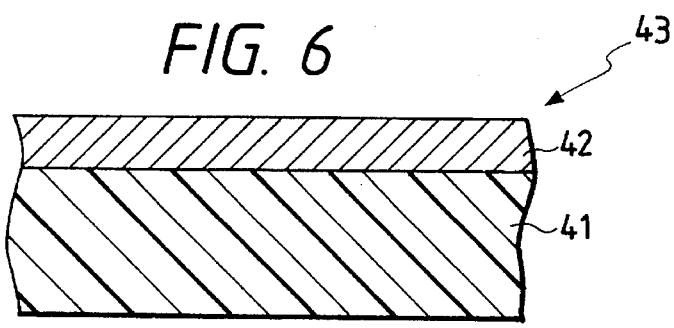
FIG. 6 is a sectional view of a laminated member of the ink jet head shown in FIGS. 4 and 5, showing a laminating process according to the first embodiment of the present invention.

FIG. 6 is a sectional view of a laminated member of the ink jet head 31 showing a laminating process according to the first embodiment of the present invention.

As shown in FIG. 6, a first synthetic resin film 41 such as polyimide resin or the like is first melted and then cast at the thickness $T_1$ to laminate it on a conductive metal film 42 such as copper or the like. The first synthetic resin film 41 is transparent or semitransparent and is utilized as the insulating base 33. Also, the conductive metal film 42 is processed to produce the etched electrodes 35, 36 as described later.

Therefore, a laminated member 43 consisting of the films 41, 42 is produced.

Figure 7:
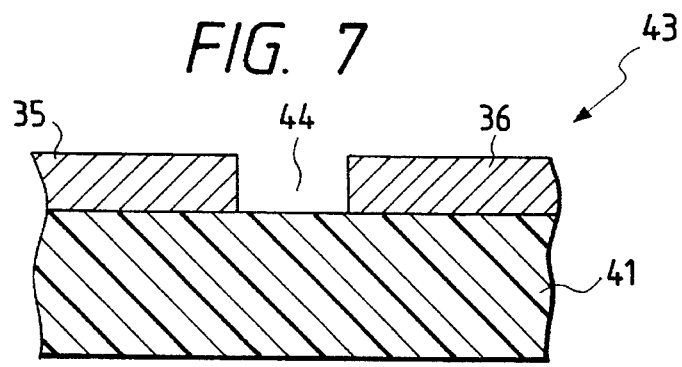
FIG. 7 is a sectional view of the laminated member etched, showing an etched electrode producing process according to the first embodiment of the present invention.

FIG. 7 is a sectional view of the laminated member 43, of which the conductive metal film 42 is etched, showing an etched electrode producing process according to the first embodiment of the present invention.

The conductive metal film 42 is etched by ion beams to produce the series of etched electrodes 35, 36 after a resin film applied to the conductive metal film 42 is printed in desired patterns by irradiating the resist film with beams of ultraviolet light through an exposure mask, according to lithography and etching techniques.

Therefore, each of the pairs of etched electrodes 35, 36 is arranged with high accuracy so as to face each other through an opening 44, and the pairs of etched electrodes 35, 36 are arranged with high accuracy at the pitch P.

In this case, in place of a dry etching process utilizing the ion beams, it is preferable that the conductive metal film 42 be chemically etched according to a wet etching process.

Figure 8:
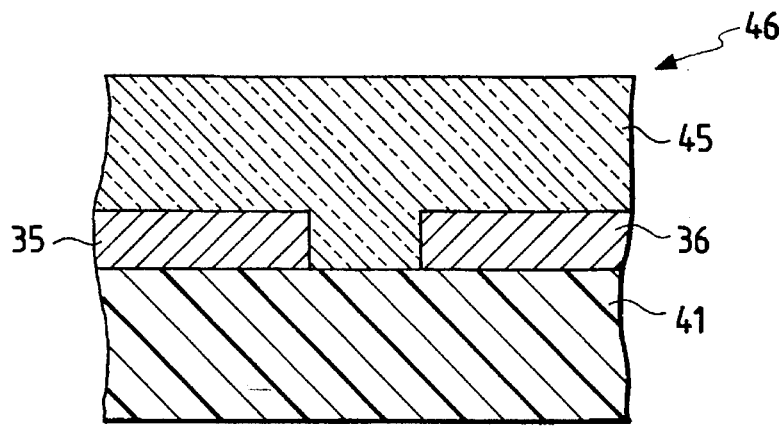
FIG. 8 is a sectional view of a head base of the ink jet head shown in FIGS. 4 and 5, showing an insulating cover member laminating process according to the first embodiment of the present invention.

FIG. 8 is a sectional view of a head base of the ink jet head 31 showing an insulating cover member laminating process according to the first embodiment of the present invention.

As shown in FIG. 8, after the etched electrodes 35, 36 are produced, a second synthetic resin film 45 such as polyimide resin or the like is melted and then cast at a thickness $T_3$ to laminate it on the etched electrodes 35, 36 and the first synthetic resin film 41. The second synthetic resin film 45 is transparent or semitransparent and is utilized as the insulating cover member 39.

Therefore, a head base 46 consisting of the etched electrodes 35, 36 and the first and second synthetic resin films 41, 45 is produced.

In this case, even though the first synthetic resin film 41 is undesirably etched when the series of etched electrodes 35, 36 are produced according to the dry etching process or the wet etching process, a hole undesirably formed in the first synthetic resin film 41 is buried by the second synthetic resin film 45.

Figure 9:
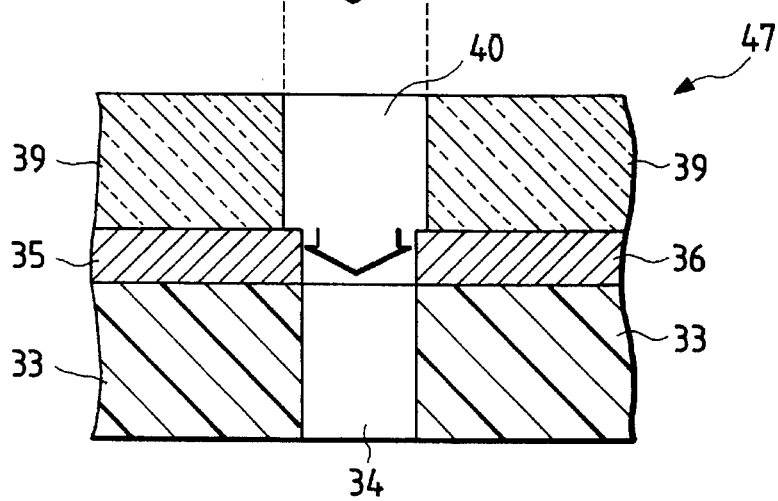
FIG. 9 is a sectional view of an expelling nozzle and an ink passageway of the ink jet head shown in FIGS. 4 and 5, showing an expelling nozzle and ink passageway producing process according to the first embodiment of the present invention.

FIG. 9 is a sectional view of an expelling nozzle and an ink passageway of the ink jet head 31 showing an expelling nozzle and ink passageway producing process according to the first embodiment of the present invention.

As shown in FIG. 9, after the head base 46 is produced, the second synthetic resin film 45 is irradiated with light beams of an excimer laser Le from over the second synthetic resin film 45 for a prescribed time. In this case, an excimer laser source (not shown) for generating the beams of excimer laser Le is arranged above the second synthetic resin film 45. Also, the light beam of the excimer laser Le is focused at a spot diameter D of 60 μm. In addition, the energy intensity of the excimer laser Le is adjusted in advance of the irradiation. Therefore, a plurality of expelling nozzles 40 having the diameter D and the depth $T_3$ are formed.

Following on the formation of the expelling nozzles 40, the ink passageways 34 are formed through the first synthetic resin family 41 by irradiating the first synthetic resin film 45 with light beams of an excimer laser Le through the expelling nozzles 40. As a result of the formation of the expelling nozzles 40 and the ink passageways 34, the insulating base 33 and the insulating cover member 39 are formed.

In this case, because the molecular binding energy of the synthetic resin is relatively low the synthetic resin is vaporized at a low energy. In cases where the energy intensity of the excimer laser Le is adjusted at a regular value, the molecular binding of the first and second synthetic resin films 41, 45 are instantaneously destroyed and ablated to form the expelling nozzles 40 and the ink passageways 34 by irradiating the films 41, 45 with the light beams of the excimer laser Le. At this time, because the films 41, 45 irradiated with the light beams of the excimer laser Le is not heated, peripheries of the expelling nozzles 40 and the ink passageways 34 are not heated by the energy of the excimer laser Le. On the other hand, because atoms linked together by metallic bond in the conductive metal, film 42 are firmly bonded with one another, the etched electrodes 35, 36 are not damaged by the irradiation of the light beams of excimer laser Le.

The cross section of the expelling nozzles 40 is normally in a circular form, and the cross section of the ink passageways 34 is in a rectangular form agreeing with a cross-sectional form of the opening 44.

In place of the excimer laser Le, it is preferred that the first and second synthetic resin films 41, 45 be opened by irradiating with any type of laser beam such as yttrium aluminum garnet (YAG) laser or carbon dioxide gas ($CO_2$ laser. In this case, the films 41, 45 irradiated with light beams of YAG laser or $CO_2$ laser are melted and vaporized. However, the etched electrodes 35, 36 are not melted by adjusting the energy intensity of the YAG laser or the $CO_2$ laser.

Also, it is preferred that the expelling nozzles 40 be opened through the first and second synthetic resin films 45 by irradiating ultraviolet light through a mask and etching the first and second synthetic resin films 45 irradiated with the ultraviolet light according to lithography and etching techniques.

Because the second synthetic resin film 45 is transparent or semitransparent, a central axis of the light beam of the excimer laser Le is accurately aligned with the center of the opening 44 between the etched electrodes 35, 36 on the basis of the pair of etched electrodes 35, 36 by viewing the etched electrodes 35, 36.

Figure 10:
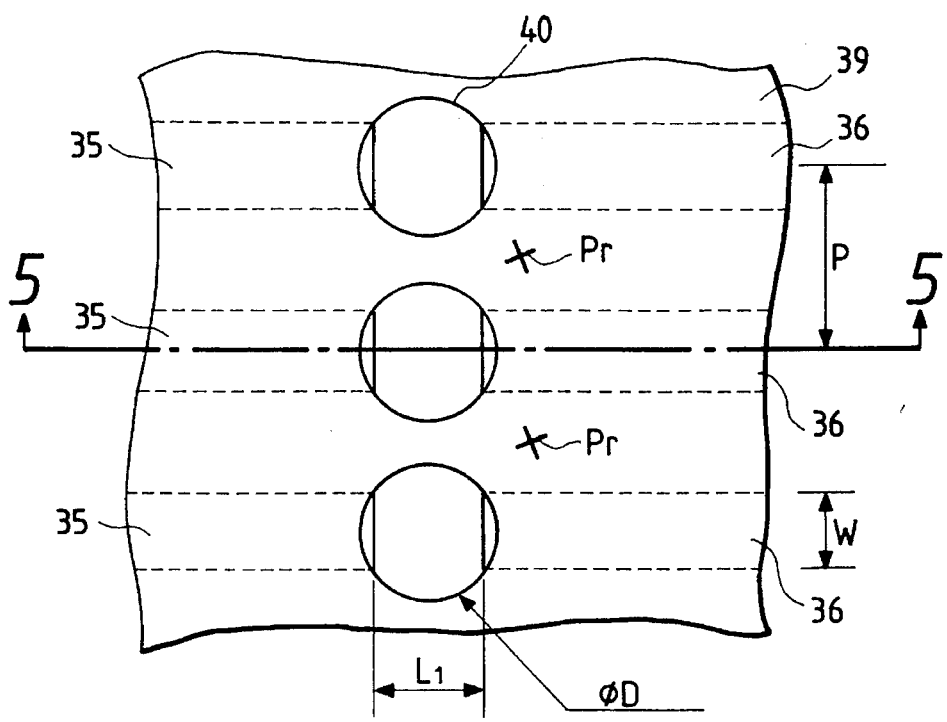
FIG. 10 is a plan view of a portion of ink jet head manufactured according to another embodiment of the present invention, showing a reference point marked to position a light beam of excimer laser.

Without utilizing the pair of etched electrodes 35, 36 as a basis for the positioning of the excimer laser Le, it is preferred that the central axis of the light beam of excimer laser Le be aligned with the center of the opening 44 on the basis of a reference point Pr which is marked at a predetermined position on the first synthetic resin film 41 in advance, as shown in FIG. 10.

Figure 11:
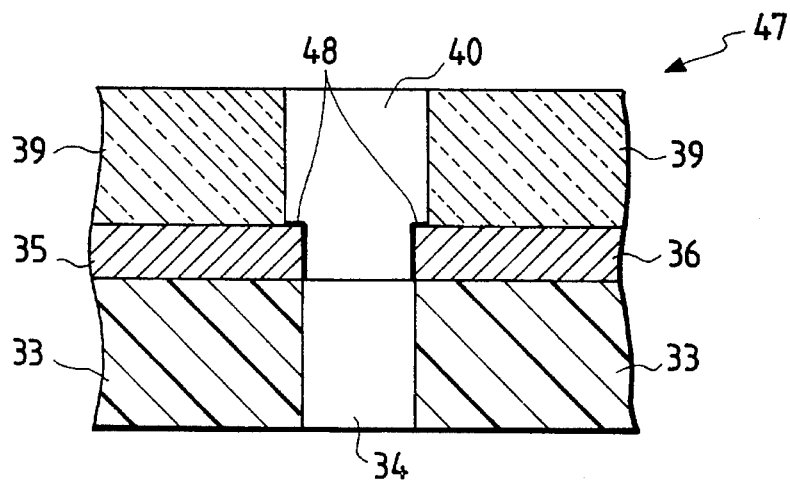
FIG. 11 is a sectional view of etched electrodes plated with nickel of the ink jet head shown in FIGS. 4 and 5.

Thereafter, an etched electrode plating process is used. That is, the head base 46 having opened the expelling nozzles 40 and the ink passageways 34 is submerged into an electrolyte containing electrolytic nickel to plate the etched electrodes 35, 36 projecting into the opening 44. As a result, the etched electrodes 35, 36 are plated with nickel 48 as shown in FIG. 11.

Therefore, the nickel-plated etched electrodes 35, 36 offer superior durability and excellent protection against corrosion.

In place of the formation of the nickel-plated etched electrodes 35, 36, are preferred that platinum-plated etched electrodes 35, 36 be formed by submerging the head base 46 into an electrolyte containing electrolytic platinum.

Thereafter, the ink holding cap 32 is attached to the insulating base 33, and the electrical leads 38 connected with the driving circuit 37 are welded to the etched electrodes 35, 36. In this case, because the ink holding cap 32 is not attached to the head base 46 when the expelling nozzles 40 and the ink passageways 34 are formed by irradiating the films 41, 45 with the light beams of excimer laser Le, the ink holding cap 32 is not opened by the irradiation of the excimer laser Le.

Thereafter, the conductive ink is supplied in the hollow portion of the insulating base 33, the ink passageways 34 and the expelling nozzles 40. Therefore, the ink jet head 31 shown in FIG. 5 is manufactured.

Figure 12:
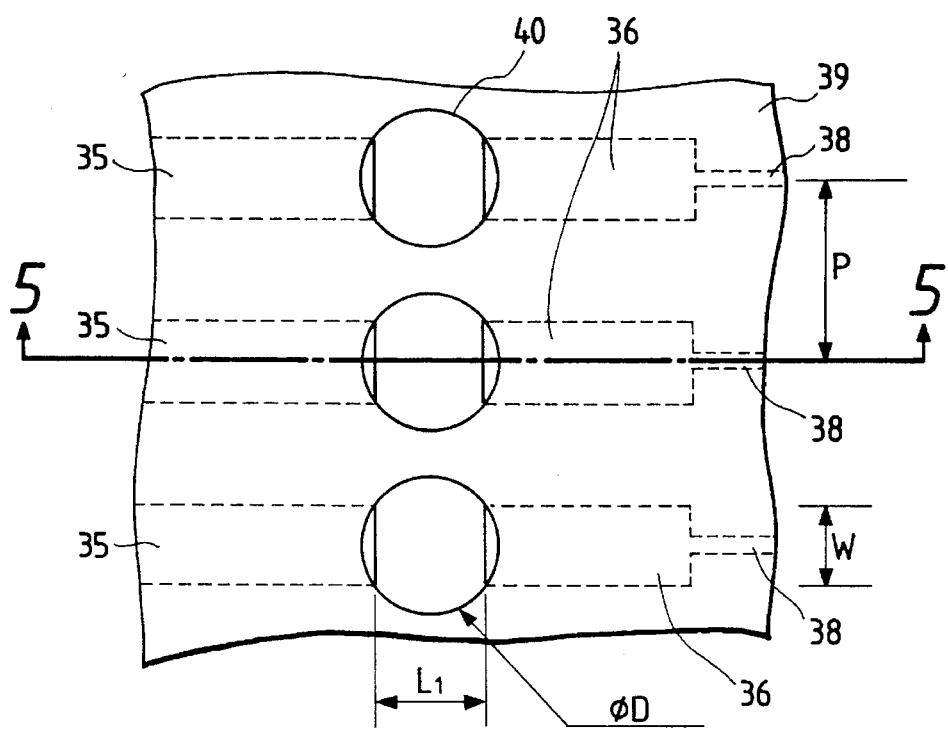
FIG. 12 is a plan view of a portion of ink jet head manufactured according to another embodiment of the present invention, showing electrical leads integrally formed with etched electrodes.

In the above method, though the process for connecting the electrical leads 38 with the etched electrodes 35, 36 differs from the process for producing the etched electrodes 35, 36, as shown in FIG. 12, it is preferred that the electrical leads 38 be integrally formed with the etched electrodes 35, 36 by etching the conductive metal film 42 according to lithography and etching techniques to produce the head base 46 constructed by thin and flexible laminated films.

In this case, because the process for connecting the electrical leads 38 with the etched electrodes 35, 36 is not required, the ink jet head 31 can be efficiently manufactured.

Also, the electrical leads 38 are reliably connected with the etched electrodes 35, 36 because they are patterned and etched by lithography and etching techniques. Therefore, the durability of the electrical leads 38 can be considerably improved.

Figure 13:
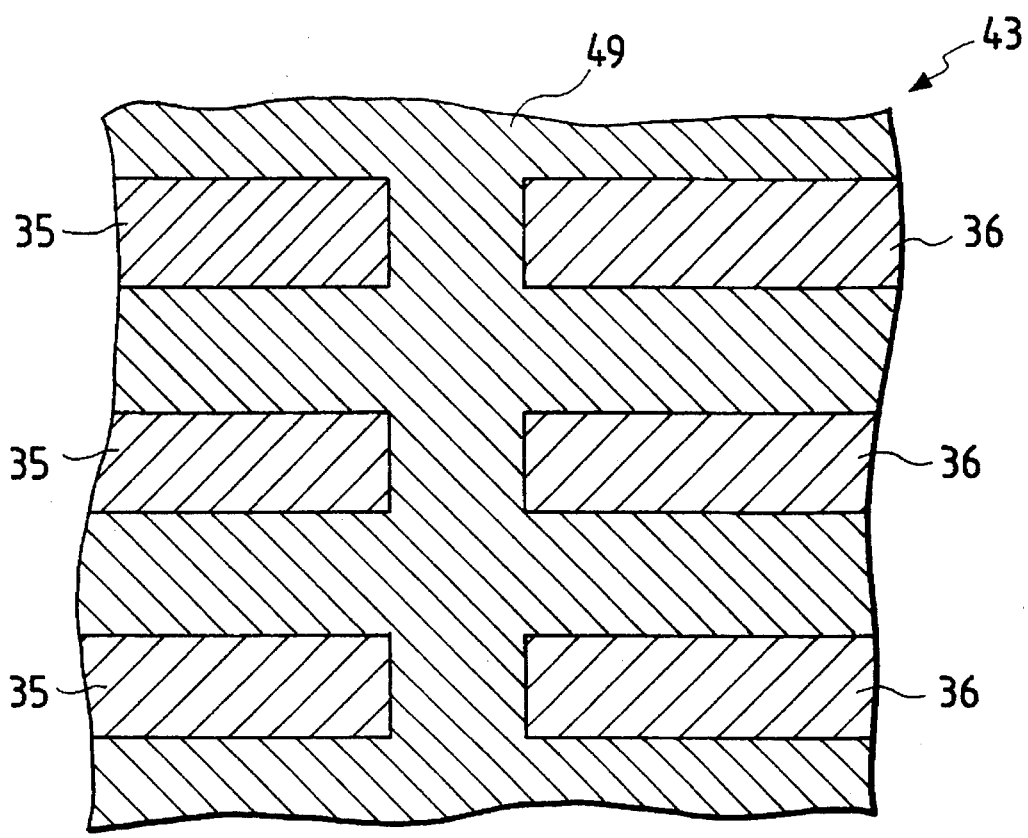
FIG. 13 is a plan view of a portion of ink jet head manufactured according to an additive process of the present invention.

In the above method, though the etched electrodes 35, 36 are produced by etching the conductive metal film 42 with the ion beam, it is preferred that electrodes 35, 36 be produced on the first synthetic resin film 41 according to an additive processing. As shown in detail in FIG. 13, a mask 49 is attached on a portion of first synthetic resin film 41 on which the electrodes 35, 36 are not scheduled to be attached. Thereafter, the synthetic resin film 41 with the mask 49 is submerged in an electrolytic containing copper to add the electrodes 35, 36 on the first synthetic resin film 41 on which the mask 49 is not attached, by utilizing an electro-plating process. Thereafter, the mask 49 is removed.

In addition, it is preferred that the first synthetic resin film 41 be bonded to the conductive metal film 42 with adhesives, in place of the casting of the first synthetic resin film 41 on the etched electrodes 35, 36. Also, it is preferred that the second synthetic resin film 45 be bonded to both the first synthetic resin film 41 and the etched electrodes 35, 36 with adhesives, in place of the casting of the second synthetic resin film 45 on the laminated member 43.

Figure 14:
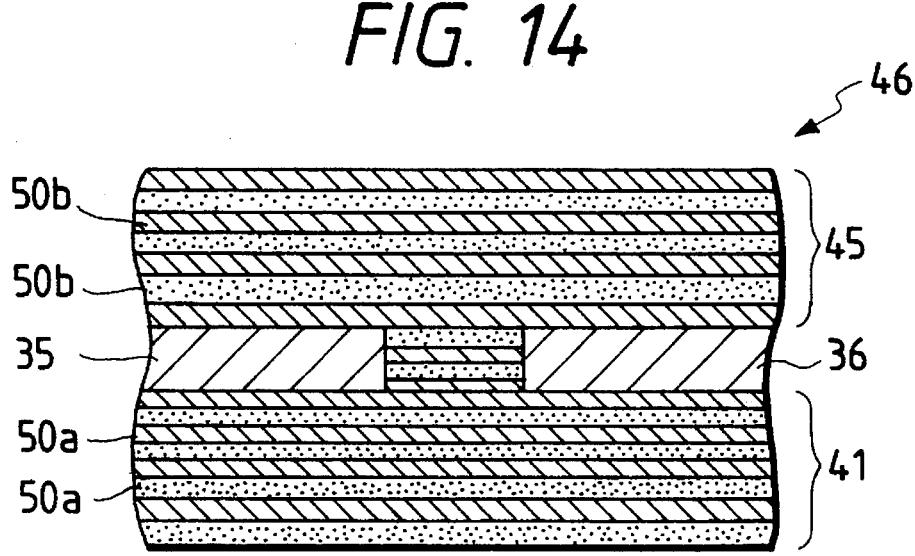
FIG. 14 is a sectional view of a head base of the ink jet head manufactured according to still another embodiment of the present invention, showing many types of films laminated to produce first and second synthetic resin films.

Furthermore, as shown in FIG. 14, it is preferred that many types of films 50a be laminated to produce the first synthetic resin film 41 or many types of films 50b be laminated to produce the second synthetic resin film 45, in place of the casting of the first synthetic resin film 41 or the second synthetic resin film 45.

Because the ink jet head 31 manufactured by the method according to the first embodiment of the present invention has the configuration described above, when a printing signal is provided to the driving circuit 37, the voltage E generated in the driving circuit 37 according to the printing signal is applied to the etched electrodes 35, 36 through the electrical leads 38. By applying the voltage E to the etched electrodes 35, 36, an electric current $I \propto V/\{\rho L_1/(W^*T_2)\}$ flows in the conductive ink held in the opening 44 between the etched electrodes 35, 36 so that the conductive ink is instantaneously heated and boiled by receiving Joule heat $V^*I$. Therefore, a bubble is formed while it rapidly expands the volume of the conductive ink held in the opening 44. As a result of the expansion of the conductive ink, a great deal of expansion force is exerted on the conductive ink held in the expelling nozzles 40. Therefore, droplets of conductive ink are expelled from open ends of the expelling nozzles 40. The droplets of conductive ink are printed on a sheet of paper (not shown) to illustrate a character or the like.

After a prescribed time has elapsed, the application of the voltage V is stopped so that the bubble generated in the opening 44 between the etched electrodes 35, 36 contracts and disappears. As a result of the contraction of the bubble, a negative pressure is generated in the expelling nozzles 40 so that the conductive ink held in the ink holding cap 32 is supplied into the expelling nozzles 40 by capillary action.

Therefore, a series of characters are successively printed on the sheet of paper.

Inventors of the present invention made an experiment in which droplets of conductive ink are expelled from the ink jet head 31 to the sheet of paper, prior to the present application.

Electrical conditions under which the experiment was made include a frequency F of voltage signals provided from the driving circuit 37 to the etched electrodes 35, 36 that was 3 kHz, an electric current I flowing through the conductive ink held in the opening 44 between the etched electrodes 35, 36 was 20 mA, a voltage E applied to the etched electrode 35, 36 was 50 V, and a continuation time t for continuing to apply the voltage E to the etched electrodes 35, 36.

In the above electrical conditions, the droplets of conductive ink were stably expelled to clearly print letters on the sheet of paper.

Accordingly, as a result of the manufacturing of the ink jet head 31 according to the method of the present invention, because the openings 44 between the etched electrodes 35, 36 are formed by lithography and etching techniques, the openings 44 can be formed in the same shape as one another. Also, the openings 44 can be arranged very regularly. In addition, because the expelling nozzles 40 are positioned on the basis of the pair of etched electrodes 35, 36 or a reference point marked in advance, the central axis of each of the expelling nozzles 40 can be accurately adjusted at the center of the opening 44. Therefore, pieces of conductive ink held in the openings 44 are heated and expelled in the same manner as that held in the other openings 44. That is, the droplets of conductive ink can be stably expelled from the expelling nozzles 40 to clearly print characters on the sheet of paper.

Also, because the openings 44 are formed by applying the lithography and etching techniques and the expelling nozzles 40 are formed by irradiating the films 41, 45 with the light beams of an excimer laser Le, the expelling nozzles 40 can be completely formed is that the ink jet head 31 can be miniaturized.

Figure 1:
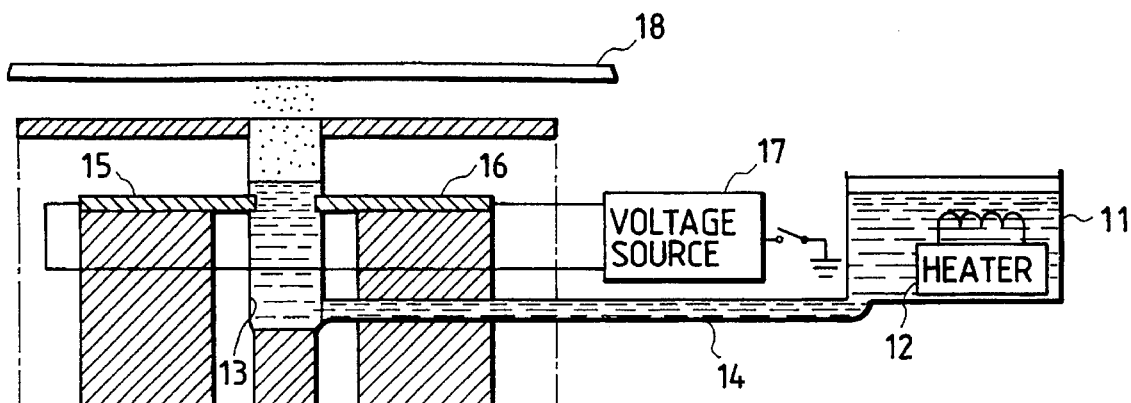
FIG. 1 illustrates a conventional ink jet head constructed in accordance with the basic concept of the invention disclosed in U.S. Pat. No. 3,179,042.
Figure 2:
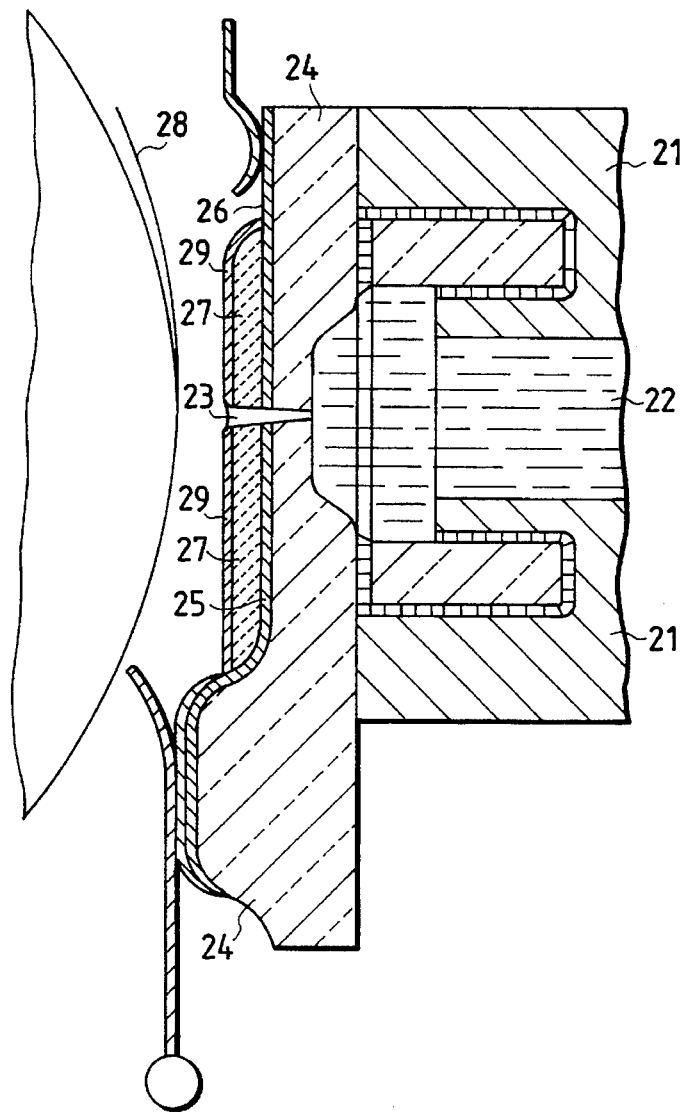
FIG. 2 is a sectional view of a portion of another conventional ink jet head in accordance with the basic concept of the invention disclosed in U.S. Pat. No. 4,595,938.
Figure 3A:
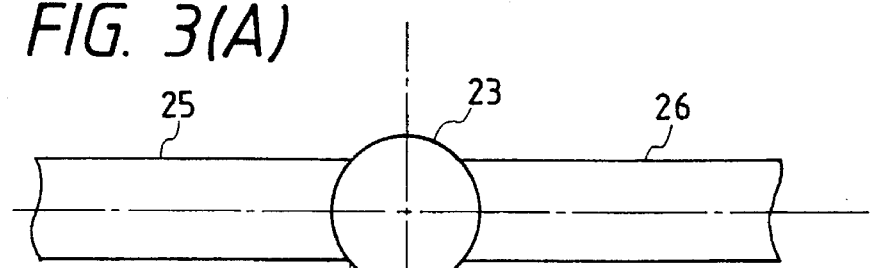
FIG. 3(A) is a sectional view of an expelling nozzle shown in FIG. 2, explanatorily illustrating the expelling nozzle produced right in the middle of etched electrodes.
Figure 3B:
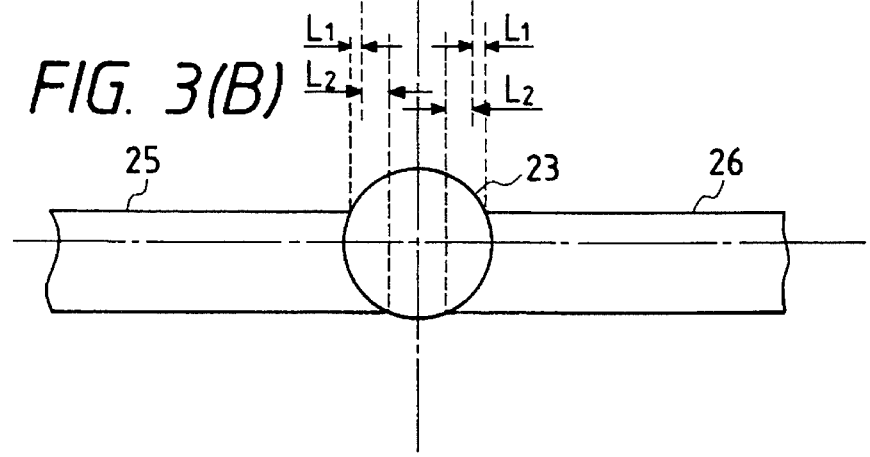
FIG. 3(B) is a sectional view of another expelling nozzle shown in FIG. 2, explanatorily illustrating the expelling nozzle produced at a position deviated from the middle of etched electrodes.

In addition, even though the central axis of each of the expelling nozzles 40 is slightly deviated from the center of the opening 44, the droplets of conductive ink can be stably expelled from the expelling nozzles 40 because the openings 44 are formed to have the same shape as one another. In other words, the production of the expelling nozzles 40 does not exert influence on the production of the openings 44, while the nozzle 23 is produced with the production of the electrodes 25, 26 in the conventional ink jet head shown in FIG. 2.

Accordingly, a large number of ink jet heads 31 can be reliably manufactured.

Figure 15:
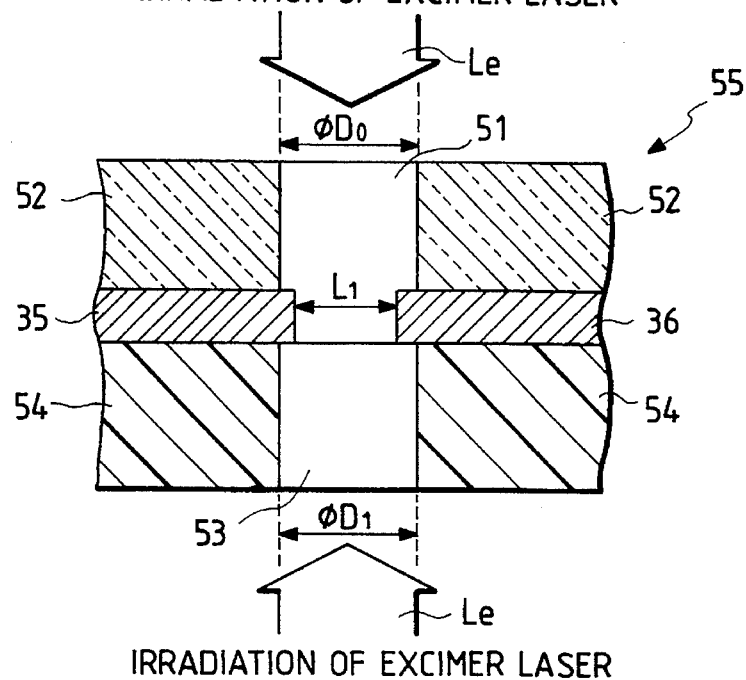
FIG. 15 is a sectional view of an expelling nozzle and an ink passageway formed through the first and second synthetic resin films shown in FIG. 8 according to a second embodiment of the present invention.
Figure 16:
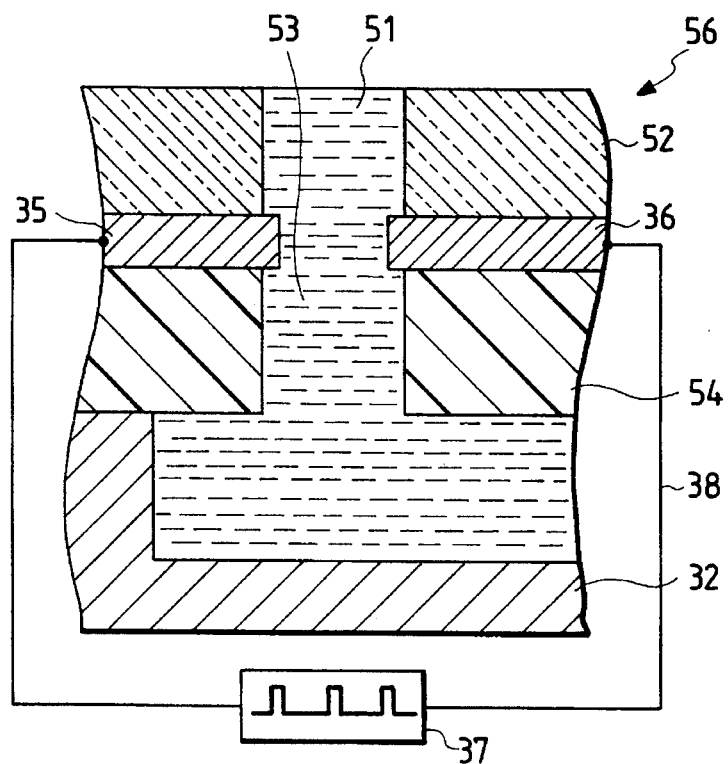
FIG. 16 is a sectional view of an ink jet head manufactured by a method according to a second embodiment of the present invention.

Next, another method for manufacturing an ink jet head is described according to a second embodiment of the present invention with reference to FIGS. 15 and 16.

FIG. 15 is a sectional view of an expelling nozzle and an ink passageway formed through the first and second synthetic resin films 41, 45 according to a second embodiment of the present invention.

As shown in FIG. 15, the second synthetic resin film 45 of the head base 46 shown in FIG. 8 is irradiated with the light beams of an excimer laser Le from over the second synthetic resin film 45 to form expelling nozzles 51 having a diameter $D_o$ of 60 μm longer than the distance $L_1$ between the etched electrodes 35, 36. Therefore, an insulating cover member 52 is produced. After forming the expelling nozzles 51, the first synthetic resin film 41 of the head base 46 shown in FIG. 8 is irradiated with the light beams of an excimer laser Le from below the first synthetic resin film 41 to form ink passageways 53 having a diameter $D_1$ longer than the distance $L_1$. Therefore, an insulating base 54 is produced. As a result, an opened head base 55 consisting of the insulating cover member 52, the etched electrodes 35, 36 and the insulating base 54 is produced.

Thereafter, the ink holding cap 32 is attached to the insulating base 54, the electrical leads connected with the driving circuit 37 are welded to the etched electrodes 35, 36. As a result, as shown in FIG. 16, an ink jet head 56 is manufactured according to the manufacturing method of the second embodiment.

Therefore, as compared with the etched electrodes 35, 36 projected into the expelling nozzle 40 and the ink passageway 34 in the ink jet head 31, the exposed surface area of the etched electrodes 35, 36 projected into the expelling nozzle 51 and the ink passageway 53 is larger in the ink jet head 56 because the bottom ends of the etched electrodes 35, 36 are exposed in the ink passageway 53. As a result, a great deal of electric current flow between the etched electrodes 35, 36 as compared with that in the ink jet head 31. Accordingly, the conductive ink held between the etched electrodes 35, 36 as compared with that in the ink jet head 31. Accordingly, the conductive ink held between the etched electrodes 35, 36 is rapidly heated and vaporized before Joule heat generated in the conductive ink tends to dissipate to the periphery of the conductive ink. That is, the conductive ink held between the etched electrodes 35, 36 can be efficiently heated and vaporized.

Figure 17:
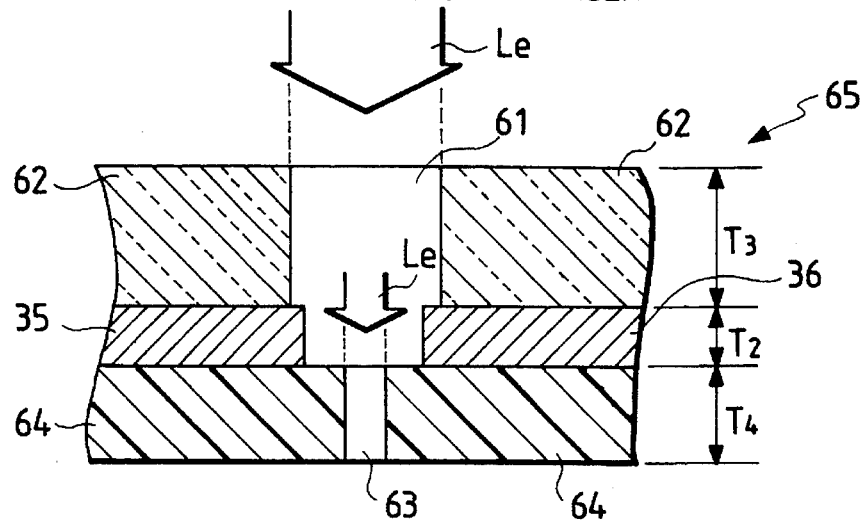
FIG. 17 is a sectional view of an expelling nozzle and an ink passageway formed through both a first synthetic resin film and the second synthetic resin film shown in FIG. 8 according to a third embodiment of the present invention.
Figure 18:
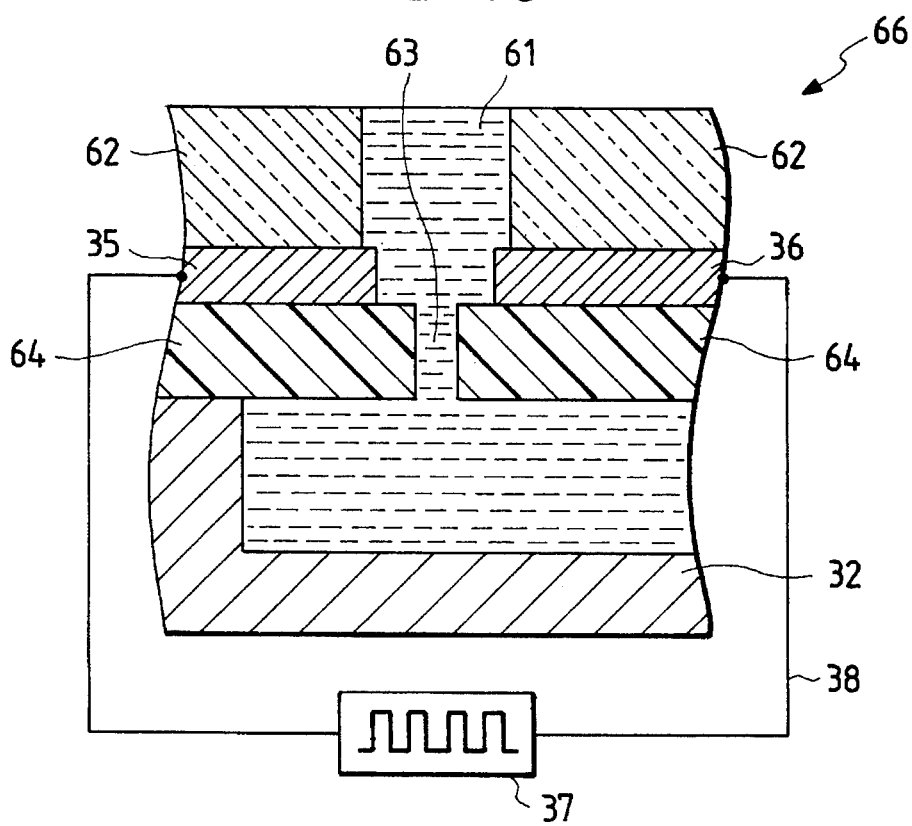
FIG. 18 is a sectional view of an ink jet head manufactured by a method according to a third embodiment of the present invention.

Next, a method for manufacturing an ink jet head is described according to a third embodiment of the present invention with reference to FIGS. 17 and 18.

FIG. 17 is a sectional view of an expelling nozzle and an ink passageway formed through both a first synthetic resin film and the second synthetic resin film 45 according to a third embodiment of the present invention.

As shown in FIG. 17, a thin type of head base is provided which consists of second synthetic resin film 45, etched electrodes 35, 36, and a thin type of first synthetic resin film having a thickness $T_4$ thinner than the thickness $T_1$ of the first synthetic film 41. The second synthetic resin film 45 of the thin type of head base is irradiated with the light beams of an excimer laser Le from over the second synthetic resin film 45 for a prescribed time. In this case, the light beam of the excimer laser Le is focused at a spot diameter $D_o$. In addition, the energy intensity of the excimer laser Le is adjusted in advance of the irradiation, so that expelling nozzles 61 having the diameter $D_o$ and the depth $T_2+T_3$ are formed by ablating the second synthetic resin film 45 irradiated with the excimer laser Le. Also, an insulating cover member 62 is produced of the second synthetic resin film 45.

After forming the expelling nozzles 61, the spot diameter $D_o$ of the light beams of excimer laser Le is decreased to a spot diameter $D_2$ lower than the distance $L_1$. Thereafter, the thin type of first synthetic resin film is irradiated with the light beams of the excimer laser Le from over the insulating cover member 62 through the expelling nozzles 61 for a prescribed time. Therefore, ink passageways 63 having the diameter $D_2$ and the depth $T_4$ are formed by ablating the second synthetic resin film 45 irradiated with the light beams of the excimer laser Le at a regular speed. Also, an insulating base 64 is produced of the thin type of first synthetic resin film. As a result, an opened head base 65 consisting of the insulating cover member 62, the etched electrodes 35, 36 and the insulating base 64 is produced.

Thereafter, the ink holding cap 32 is attached to the insulating base 64 and the electrical leads connected with the driving circuit 37 are welded to the etched electrodes 35, 36. As a result, as shown in FIG. 18, an ink jet head 66 is manufactured according to the manufacturing method of the third embodiment.

In the above configuration of the ink jet head 66 manufactured by the method according to the third embodiment, when a negative pressure is generated in each of the expelling nozzles 61 after a droplet of conductive ink is expelled, the conductive ink held in the hollow portion of the ink holding cap 32 is provided into the expelling nozzle 61 through the ink passageway 64 of which the length is shorter than that of the ink passageway 34 shown in FIG. 5 and the cross-sectional area is smaller than that of the ink passageway 34. Also, because an expansion force exerted by the negative pressure in the ink jet head 66 is the same as that in the ink jet head 31 shown in FIG. 5, the conductive ink is transferred into the expelling nozzle 61 at a high speed as compared with the conductive ink in the ink jet head 31. After the conductive ink is transferred into the expelling nozzle 61, the conductive ink held in the expelling nozzle 61 tends not to return to the ink holding cap 32 because both the surface tension of the conductive ink generated at an open end of the expelling nozzle 61 and the viscous friction between the conductive ink and the ink passageway 63 prevent back flow of the conductive ink.

Accordingly, conductive ink can remain held in the expelling nozzles 61 for a long time so that the ink jet head 66 can be reliably operated.

Figure 19:
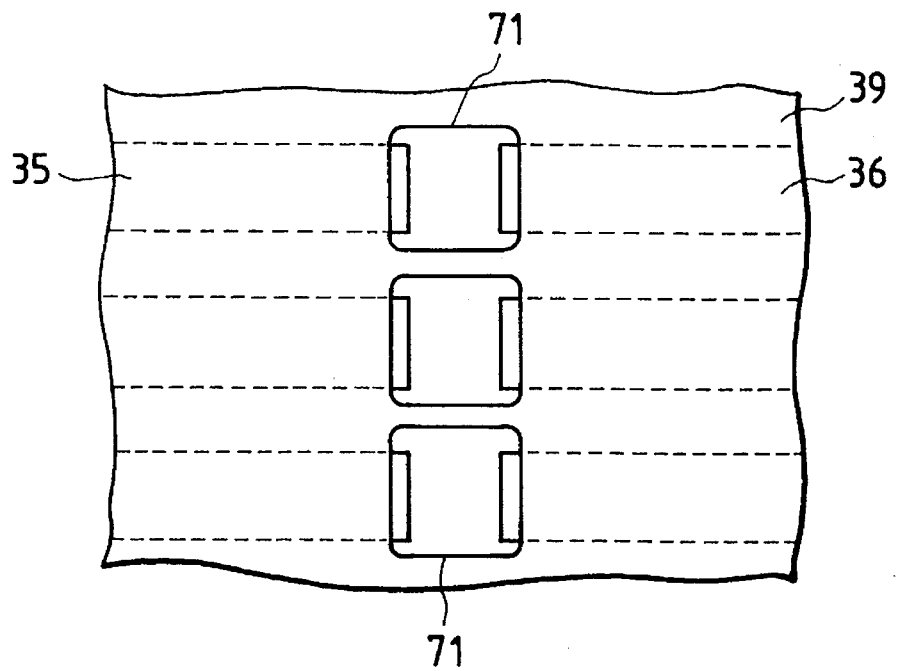
FIG. 19 is a plan view of a portion of an ink jet head manufactured by a method according to a fourth embodiment of the present invention.

Next, a method for manufacturing an ink jet head is described according to a fourth embodiment of the present invention with reference to FIG. 19.

FIG. 19 is a plan view of a portion of an ink jet head manufactured by a method according to a fourth embodiment of the present invention.

As shown in FIG. 19, the cross section of the excimer laser beam has a rectangular form. Therefore, expelling nozzles 71 of which the cross section is rectangular form are formed.

In the case of an ink jet head having the expelling nozzles 71 manufactured according to the fourth embodiment, because the width of each of the expelling nozzles 71 can be set to be almost the same as the width W of the etched electrodes 35, 36, the expelling nozzles 71 can be compactly formed as compared with the expelling nozzles 40 shown in FIG. 5.

Accordingly, a small ink jet head can be manufactured according to the fourth embodiment.

Figure 20:
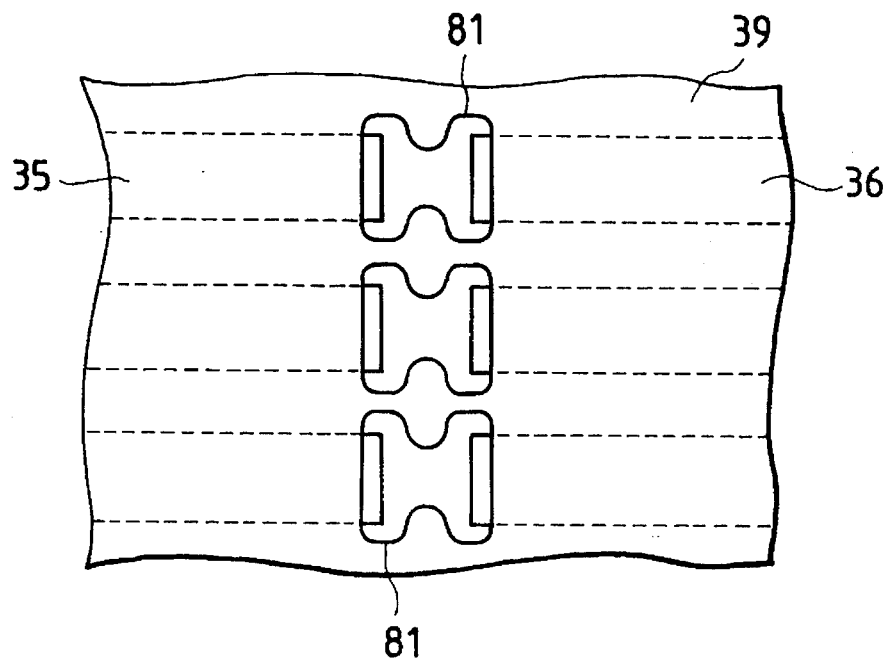
FIG. 20 is a plan view of a portion of an ink jet head manufactured by a method according to a fifth embodiment of the present invention.

Next, a method for manufacturing an ink jet head is described according to a fifth embodiment of the present invention with reference to FIG. 20.

FIG. 20 is a plan view of a portion of an ink jet head manufactured by a method according to a fifth embodiment of the present invention.

As shown in FIG. 20, the cross section of the excimer laser beam has an almost a rectangular form. Therefore, expelling nozzles 81 of which the cross section is almost the rectangular form are formed. In detail, the middle area of the expelling nozzle 81 between the etched electrodes 35, 36 becomes narrower than the width W of the etched electrodes 35, 36. Therefore, the intensity of the electric current flowing between the etched electrodes 35, 36 becomes higher in the middle area of the expelling nozzle 81 than areas around the etched electrodes 35, 36.

Accordingly, the generation of Joule heat is concentrated in the middle are so that the Joule heat can be efficiently used to form a bubble of conductive ink without tending dissipate the Joule heat to the periphery of the expelling nozzle 81.

In addition, the generation of the Joule heat is concentrated in the middle are so that a bubble of conductive ink can be easily formed in the center of the expelling nozzle 81. That is, a droplet of conductive ink can be reliably expelled from the expelling nozzle 81.

Though various types of ink jet heads are described above, one of the ink jet heads can be selected, depending on the objective or a type of printer.

Also, features of the ink passageway 53 or 63 shown in FIG. 15 or FIG. 17 can be combined with features of the expelling nozzle form shown in FIG. 19 or FIG. 20.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for manufacturing an ink jet head in which droplets of conductive ink are expelled, comprising the steps of:

attaching a conductive metal film on a first insulating film;

etching the conductive metal film to produce a pair of etched electrodes with an opening positioned between the etched electrodes;

attaching a second transparent insulating film on the etched electrodes and the first insulating film so that the etched electrodes are between the first insulating film and the second transparent insulating film and the opening is occupied with the second transparent insulating film;

excavating both the first insulating film and the second transparent insulating film with a beam of light to form both an expelling nozzle penetrating the second transparent insulating film through the opening and an ink passageway penetrating the first insulating film, the etched electrodes projecting into the expelling nozzle and the ink passageway communicating with the expelling nozzle;

attaching an ink holding cap to the first insulating film to hold conductive ink in a hollow portion thereof; and electrically connecting the etched electrodes with a voltage generator through electrical leads for applying a voltage generated in the voltage generator to the etched electrodes.

2. A method according to claim 1 in which the beam of light is a light beam from an excimer laser.

3. A method according to claim 2 in which the step of excavating both the first insulating film and the second transparent insulating film includes:

adjusting the energy intensity of the light beam to excavate the films without damaging the etched electrodes;

adjusting a cross-sectional size of the light beam to form the expelling nozzle in which the etched electrodes are projected;

irradiating the second transparent insulating film with the light beam from above the second transparent insulating film; and irradiating the first insulating film with the light beam from above the second transparent insulating film through the expelling nozzle to form the ink passageway which has a cross-sectional size similar to that of the opening.

4. A method according to claim 2 in which the step of excavating both the first insulating film and the second transparent insulating film includes:

adjusting the energy intensity of the light beam to excavate the films without damaging the etched electrodes;

adjusting a cross-sectional size of the light beam to form the expelling nozzle in which the etched electrodes project;

irradiating the second transparent insulating film with the light beam from above the second transparent insulating film;

readjusting the cross-sectional size of the light beam to form the ink passageway which has a cross-sectional size larger than that of the opening; and irradiating the first insulating film with the light beam from a side of the first insulating film opposite to the etched electrodes.

5. A method according to claim 2 in which the step of excavating both the first insulating film and the second transparent insulating film includes:

adjusting the energy intensity of the light beam to excavate the films without damaging the etched electrodes;

adjusting the cross-sectional size of the light beam to form the expelling nozzle in which the etched electrodes project;

irradiating the second transparent insulating film with the light beam from above the second transparent insulating film;

decreasing the cross-sectional size of the light beam to form the ink passageway which has a cross-sectional size smaller than that of the opening; and irradiating the first insulating film with the light beam from above the second transparent insulating film through the expelling nozzle.

6. A method according to claim 1 further including:

plating the etched electrodes projecting into the expelling nozzle to form metal-plated etched electrodes having high corrosion resistance after the step of excavating both the first insulating film and the second transparent insulating film.

7. A method according to claim 1 in which the first insulating film and the second transparent insulating film are formed of a synthetic resin which has a molecular binding energy which is smaller than the metallic bond energy of the conductive metal.

8. A method according to claim 7 in which the step of attaching a conductive metal film includes:

melting the synthetic resin; and casting the melted synthetic resin on the conductive metal film to form the first insulating film, and the step of attaching a second transparent insulating film includes:

melting the synthetic resin; and casting the melted synthetic resin on the etched electrodes and the first insulating film to form the second transparent insulating film.

9. A method according to claim 7 in which the step of attaching a conductive metal film includes:

laying a plurality of laminated synthetic resin films on the conductive metal film to form the first insulating film, and the step of attaching a second transparent insulating film includes:

laying a plurality of laminated synthetic resin films on the etched electrodes and the first insulating film to form the second transparent insulating film.

10. A method according to claim 1 in which the step of excavating both the first insulating film and the second transparent insulating film includes:

exposing a resist film applied on the second transparent insulating film to ultraviolet light through an exposure mask to print a prescribed pattern on the resist film;

etching the second transparent insulating film with an ion beam according to the prescribed pattern printed on the resist film to form the expelling nozzle;

etching the first insulating film with an ion beam according to the prescribed pattern printed on the resist film to form the ink passageway; and removing the resist film.

11. A method according to claim 1 in which the step of excavating both the first insulating film and the second transparent insulating film includes:

marking a reference point on the first insulating film; and positioning the beam of light on the reference point to align a center of the beam of light with a middle point between the etched electrodes.

12. A method according to claim 1 in which the cross section of the beam of light penetrating the second transparent film has a circular form to form the expelling nozzle.

13. A method according to claim 1 in which the cross section of the beam of light penetrating the second transparent film has a rectangular form to form the expelling nozzle.

14. A method according to claim 1 in which the cross section of the beam of light penetrating the second transparent film is almost rectangular in form with a narrowing middle area of the expelling nozzle between the etched electrodes to form the expelling nozzle.

15. A method according to claim 1 in which the electrical leads used in the step of electrically connecting the etched electrodes with a voltage generator are integrally formed with the etched electrodes during the step of etching the conductive metal.

16. A method for manufacturing an ink jet head in which droplets of conductive ink are expelled, comprising the steps of:

attaching a mask on a portion of a first insulating film;

adding a pair of electrodes facing each other through an opening on the remaining portion of the first insulating film by an electro-plating process before removing the mask;

attaching a second transparent insulating film on the added electrodes and the first insulating film so that the electrodes are located between the first insulating film and the second transparent insulating film and the opening is occupied with the second transparent insulating film;

excavating both the first insulating film and the second transparent insulating film with a beam of light radiated from above the second transparent insulating film to form an expelling nozzle penetrating both the first insulating film and the second transparent insulating film, the opening occupied with the second transparent insulating film being excavated to project the electrodes into the expelling nozzle;

attaching an ink holding cap to the first insulating film to hold conductive ink in a hollow portion thereof; and connecting electrical leads to the electrodes for applying a voltage generated in a voltage generator to the electrodes.

17. A method for manufacturing an ink jet head in which droplets of conductive ink are expelled, comprising the steps of:

attaching a conductive metal film on a first insulating film;

etching the conductive metal film to produce a pair of etched electrodes with an opening being positioned between the etched electrodes;

attaching a second insulating film on the etched electrodes and the first insulating film so that the etched electrodes are between the first insulating film and the second insulating film and the opening is occupied with the second insulating film;

excavating both the first insulating film and the second insulating film with a beam of light to form both an expelling nozzle penetrating the second insulating film through the opening and an ink passageway penetrating the first insulating film, the etched electrodes projecting into the expelling nozzle and the ink passageway communicating with the expelling nozzle;

attaching an ink holding cap to the first insulating film to hold conductive ink in a hollow portion thereof; and electrically connecting the etched electrodes with a voltage generator through electrical leads for applying a voltage generated in the voltage generator to the etched electrodes.

18. A method for manufacturing an ink jet head in which droplets of conductive ink are expelled, comprising the steps of:

attaching a conductive metal film on a first insulating film;

etching the conductive metal film to produce a pair of etched electrodes with an opening positioned between the etched electrodes;

attaching a second transparent insulating film on the etched electrodes and the first insulating film so that the etched electrodes are between the first insulating film and the second transparent insulating film and the opening is occupied with the second transparent insulating film;

excavating both the first insulating film and the second transparent insulating film with a beam of light to form both an expelling nozzle penetrating the second transparent insulating film through the opening and an ink passageway penetrating the first insulating film, the etched electrodes projecting into the expelling nozzle and the ink passageway communicating with the expelling nozzle; and electrically connecting the etched electrodes with a voltage generator through electrical leads for applying a voltage generated in the voltage generator to the etched electrodes.

* * * * *